United States Patent [19]
Schmidt et al.

[11] 3,865,796
[45] Feb. 11, 1975

[54] PHOSPHORUS-CONTAINING POLYMERS

[75] Inventors: Erwin Schmidt, Kelkheim/Taunus; Claus Beermann, Neu-Isenburg, both of Germany

[73] Assignee: Hoechst Aktiengesellschaft, Frankfurt (Main), Germany

[22] Filed: Nov. 7, 1973

[21] Appl. No.: 413,496

Related U.S. Application Data

[63] Continuation-in-part of Ser. No. 192,561, Oct. 26, 1971, abandoned.

[30] Foreign Application Priority Data
Oct. 27, 1970 Germany.............................. 2052568

[52] U.S. Cl....... 260/80 PS, 260/80.6, 260/85.5 ZA, 260/85.7 R, 260/87.7 R, 260/88.1 P, 260/DIG. 24
[51] Int. Cl. .............................................. C08f 3/84
[58] Field of Search...... 260/80 PS, 80.71, 85.5 ZA, 260/80.3 N, 79.7, 486 R, 561 P

[56] References Cited
UNITED STATES PATENTS
2,934,555    4/1960    O'Brien.......................... 260/80 PS

*Primary Examiner*—Christopher A. Henderson
*Attorney, Agent, or Firm*—Curtis, Morris & Safford

[57] ABSTRACT

Phosphorus-containing homopolymers and copolymers are disclosed which comprise recurring units of the formula

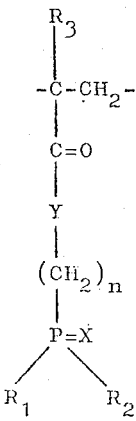

in which $R_1$ and $R_2$ stand for lower alkyl radicals. $R_3$ represents a hydrogen atom or a methyl group, X is an oxygen or a sulfur atom, Y is an oxygen atom or a group of the formula —NR—, wherein R stands for a hydrogen atom or a lower alkyl group, and $n$ represents 1, 2 or 3.

The polymers and, in particular, the filaments, fibers or sheets manufactured on the basis of these polymers containing phosphorus are marked by a reduced inflammability and and improved capability of being dyed.

9 Claims, No Drawings

PHOSPHORUS-CONTAINING POLYMERS

This application is a continuation-in-part of copending application Ser. No. 192,561 filed Oct. 26, 1971, now abandoned.

The present invention relates to phosphorus-containing polymers.

It has been proposed to make polymers flame-proof by adding or incorporating compounds which contain phosphorus.

The present invention relates to polymers with a reduced inflammability, which also have an improved capability of being dyed. The subject of the invention is therefore novel polymers containing phosphorus, comprising recurring units of the general formula

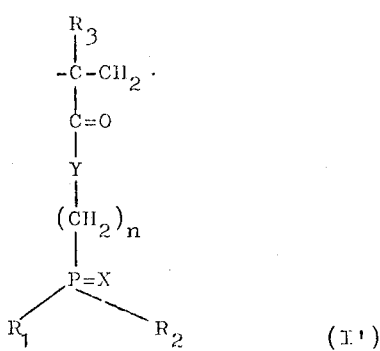

in which $R_1$ and $R_2$ stand for lower alkyl radicals having up to 3 carbon atoms, $R_3$ stands for a hydrogen atom or a methyl group, X represents an oxygen or a sulfur atom, Y represents an oxygen atom or a group of the formula —NR—, wherein R is a hydrogen atom or a lower alkyl group having up to 3 carbon atoms, and wherein n represents the numbers 1, 2 or 3. As lower alkyl radicals corresponding to the above-mentioned definition, methyl, ethyl, n- and i-propyl groups are preferred, in particular, methyl groups.

The process for the preparation of these polymers comprises polymerizing at least one compound of the general formula

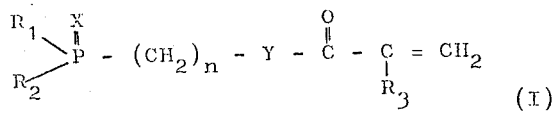

wherein $R_1$, $R_2$, $R_3$, $n$, X and Y have the same meaning as in formula I′, either separately or together with unsaturated compounds having an activated double bond, in accordance with processes known for the polymerization of unsaturated compounds.

It is particularly advantageous to use for this polymerization the compounds of the general formula I in an amount of from 5 to 45 percent by weight, calculated on the total monomer mixture.

The subject of the invention also comprises homopolymers consisting essentially of recurring units of a single type falling within formula I′ as well as copolymers having different recurring units falling within formula I′.

The compounds of general formula I are advantageously prepared in accordance with the process described in U.S. Pat. application Ser. No. 192,560 filed on Oct. 26, 1971, now U.S. Pat. No. 3,766,252 by reacting alcohols or amines of general formula II

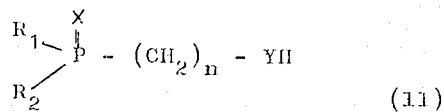

in which $R_1$, $R_2$, X, Y and n have the above-specified meaning, with compounds of the general formula III

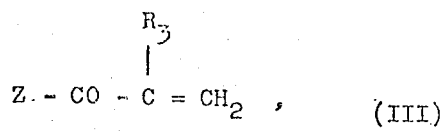

in which Z stands for a chlorine atom or a group of the formula $R_4O—$, wherein $R_4$ represents a lower alkyl group, preferably the methyl group, and in which $R_3$ has the above-specified meaning.

The acylation of the alcohols and amines with acrylic acid or methacrylic acid chloride is preferably carried out in the presence of a hydrogen chloride binding agent, for example a tertiary amine, such as triethylamine or pyridine. The transesterification of the alcohols of formula II (Y = O) is preferably carried out in the presence of a metal alcoholate in accordance with known methods.

The starting materials of formula II can be obtained according to known methods. For example, the phosphine oxide-alcohols may be prepared according to the processes described in the following literature references: E. J. Grinstein, et al., Z. obsc. Chim. 36, (1966), 302; A. B. Brucker, et al., Z. obsc. Chim. 36, (1966), 484; German Pat. Application No. P 2,040,280.6. It is also possible to obtain phosphine-oxidoamines of the formula II, not only by the process described in the above-mentioned German Patent Application, but also in accordance with the method of preparation of N. Kreutzkamp, Angew. Chem. 77, (1965), 1,133. The phosphine-sulfido compounds of formula II can be prepared according to the method described by K. A. Petrov, et al., Z. obsc. Chim. 35, (1965); 2,062, or in accordance with the process described in German Pat. No. 1,300,562.

Carboxylic acid derivatives containing phosphorus falling under formula I which are used for the preparation of the polymers of the invention are, for example: the acrylic acid and methacrylic acid esters of dimethyl-hydroxymethyl-phosphine oxide, dimethyl-hydroxyethyl-phosphine oxide, dimethyl-hydroxypropyl-phosphine oxide, methyl-ethyl-hydroxymethyl-phosphine oxide, methyl-i-propyl-hydroxypropyl-phosphine oxide, diethyl-hydroxymethyl-phosphine oxide, di-i-propyl-hydroxymethyl-phosphine oxide, dimethyl-hydroxymethyl-phosphine sulfide, ethyl-n-propyl-hydroxymethyl-phosphine sulfide, besides, N-(dimethyl-phosphine oxido-propyl)-acrylamide, N-methyl-N-(diethyl-phosphine-oxido-propyl-) methylacrylamide, N-propyl-N-(dipropyl-phosphine-oxido-propyl-)acrylamide, N-(methyl-ethyl-phosphine-oxido-propyl-)acrylamide, etc.

The polymerization of the carboxylic acid derivatives containing phosphorus of formula I — individually or with other unsaturated compounds having an activated double bond — is carried out according to the methods known for the polymerization of unsaturated compounds, i.e., processes using ionic, free radical or redox catalysts, in solution or dispersion as solution, bead, or precipitation polymerization, or in bulk. Generally, the free radical or redox polymerization is to be preferred to ionic polymerization, which gives a lower polymerization degree and a smaller yield, in particular in the case of acrylic acid esters.

As catalyst systems there are suitable, for example: hydrogen peroxide, potassium or ammonium peroxydisulfate, di-benzoyl-peroxide, tertiary butyl-hydroperoxide, di-tert.-butylperoxide, and other organic peroxides, diazomethane, azo-isobutyric acid dinitrile, and their derivatives, diazonium and diazo compounds, inorganic and organic peroxides in combination with iron-(II)-salts, with sodium bisulfite, sulfinic acids or mercaptans. The polymerization may also be initiated by radical-forming radiation.

As solvents or diluents, there are suitable numerous organic solvents, for example, dimethyl formamide, chlorobenzene, methanol, ethanol, i-propanol, acetone. It is particularly advantageous, especially for economical reasons, to operate in aqueous systems. Common emulsifying agents and protective colloids may be added to the polymerization in heterogeneous phase.

As comonomers having an activated double bond for the preparation of copolymers with the carboxylic acid derivatives containing phosphorus of formula I, there are suitable the unsaturated monomers having an activated double bond which are known in literature, for example, acrylonitrile, acrylamide, acrylic acid and its esters, vinyl esters and vinyl ethers, such as vinyl acetate, vinyl stearate, vinyl butyl ether; vinyl-and vinylidene halides, such as vinyl chloride, vinyl bromide, vinylidene chloride; halo-acetic acid vinyl esters, such as bromo-acetic acid vinyl ester, dichloro-acetic acid vinyl ester, trichloro-acetic acid vinyl ester; acrylic acid-pentabromo phenol ester or styrene. A preferred comonomer is acrylonitrile. It goes without saying that copolymers may also be prepared while using several of these comonomers.

Particularly advantageous are those copolymers, which contain the carboxylic acid derivatives containing phosphorus of formula I in an amount in the range of from 5 to 45 percent by weight. On the one hand, polymers of this kind still show essential properties of the component contained as the main proportion, on the other hand, however, they are marked by an improved capability of being dyed and a reduced inflammability, as compared against the homopolymer of the main component. Already a small addition of from 0.1 to 5 percent of carboxylic acid derivatives containing phosphorus of formula I improves the hydrophilic and antistatic properties as well as the capability of being dyed of the polymers; the flame-proof properties can already be noted at this stage, however, they have not yet become fully evident. Additions in the range of from 5 to 45 percent reduce the inflammability to a minimum. The flame protection of these copolymers, for example, with acrylonitrile can become more effective, if the copolymers contain, besides the ester containing phosphorus, also halogen (for example, copolymers with vinyl halides). Moreover, filling material, such as antimony trioxide or -pentoxide and others, may also be added to the copolymers.

The copolymers of the compounds of formula I with other unsaturated compounds of the invention are particularly suitable for the preparation of fibers and sheets which are hard to inflame. The homopolymers of the carboxylic acid esters of formula I containing phosphorus as well as the copolymers which are obtained by polymerization of different compounds falling under that formula with one another, are soluble in water. They are suitable, for example, for a flame-proof finish of textile materials. Also water-soluble copolymers, for example, with vinyl-methyl acetamide or acrylamide, are suitable for the same purpose.

The following Examples serve to illustrate the invention.

EXAMPLE 1

(Preparation of two compounds falling under general formula I)

a. 108 g of

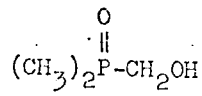

and 110 g of $(C_2H_5)_3N$ were dissolved in 300 milliliters of anhydrous acetone; at a temperature of from 5° to 10°C, 95 g of acrylic acid chloride were dropped to this solution during one hour. After another 30 minutes the precipitate (triethylamine hydrochloride) was filtered off with suction, the solvent was drawn off, and the filtrate was distilled in vacuo.

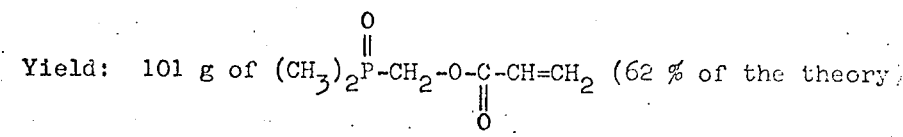

the boiling point under a pressure of 0.03 mm of mercury was in the range of from 112° to 115°C.

b. From an anhydrous mixture consisting of 200 g of

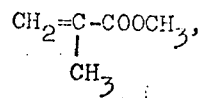

2 g of hydroquinone, 68 g of

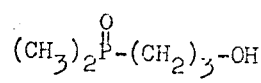

and 1 g of $Mg(OCH_3)_2$, an azeotropically boiling mixture consisting of $CH_3OH$ and

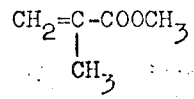

was slowly distilled off by means of a silver jacket column having a length of 1 meter.

When the sump temperature had reached 120°C, the residual acrylic acid methyl ester

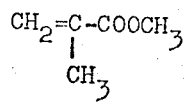

was eliminated in vacuo. Of the remaining residue, 70 g (68 percent of the theory) of

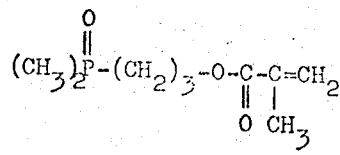

having a boiling point under a pressure of 0.5 mm of mercury of from 139° to 140°C were obtained by vacuum distillation.

EXAMPLE 2 (homopolymer)

A solution of 50 g of the compound

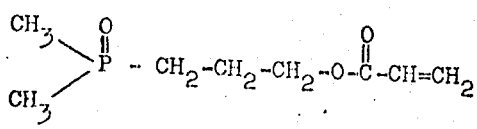

in 250 milliliters of water was de-aerated and covered with nitrogen. After 2 g of ammonium persulfate and 0.4 g of sodium bisulfite had been added, the solution was maintained at 30°C for 24 hours, whereby it became very viscous. It was then concentrated in vacuo and triturated with acetone. A solid residue was obtained which was insoluble in acetone and was dried in vacuo at 60°C. It was clearly soluble in water. A solution of 1 percent strength in water had a relative viscosity of 1.8 at 25°C.

EXAMPLE 3 (copolymer)

5 g of ammonium monopersulfate and 0.4 g of sodium bisulfite were added to a solution of 150 g of acrylonitrile and 50 g of the compound

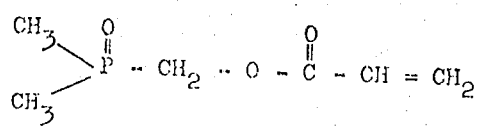

in 1 liter of a mixture consisting of equal parts of water and methanol under an atmosphere of pure nitrogen. After having been stirred for 24 hours at 30°C, the polymer obtained was filtered off with suction, was washed with methanol and dried at 60°C in vacuo. 125 g of a polymer were obtained, which had a content of phosphorus of 3.4 percent. The relative viscosity of a 1 percent solution of the polymer in dimethyl formamide at 25°C was 3.1.

A 15% solution of this polymer in dimethyl formamide was cast into sheets, which were dried in vacuo, soaked and then dried again. When the sheets were inflamed, they were self-extinguishing.

EXAMPLE 4 (copolymer)

A solution of 60 g of acrylonitrile, 10 g of vinylidene chloride and 20 g of the compound

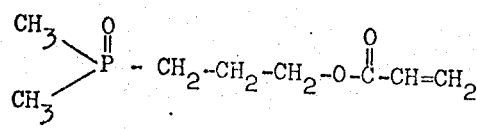

in 500 milliliters of a mixture consisting of equal parts of water and methanol was de-aerated and covered with nitrogen at a temperature of −20°C, and 2 g of ammonium monopersulfate and 0.4 g of sodium bisulfite were added. The polymerization was carried out for 24 hours at + 30°C. The precipitated polymer was filtered off with suction, was washed with methanol and dried. 75 g of polymer were obtained containing 8.4 percent of chlorine and 2.6 percent of phosphorus. The relative viscosity of a 1 percent solution of the polymer in dimethyl formamide was 3.6 at 25°C. A 15 percent solution of the polymer in dimethyl formamide was cast into films on glass plates, was dried in vacuo, soaked and dried once more. The sheets were self-extinguishing.

EXAMPLE 5 (copolymer)

A mixture prepared at −20°C consisting of 250 milliliters of water, 80 g of acrylonitrile, 10 g of vinyl bromide, 10 g of the compound

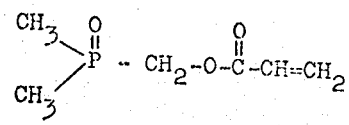

2 g of ammonium monopersulfate, and 0.4 g of sodium bisulfite was polymerized in an autoclave for 24 hours at +30°C. The polymer was filtered off with suction and was dried. The yield was 85 g. The relative viscosity of a 1 percent solution of the polymer in dimethyl formamide was 4.2 at 25°C. Sheets prepared on the basis of this polymer in accordance with Example 4 were self-extinguishing.

EXAMPLE 6 (copolymer)

With the exclusion of oxygen, 80 g of acrylonitrile, 15 g of vinylidene chloride, 5 g of the compound

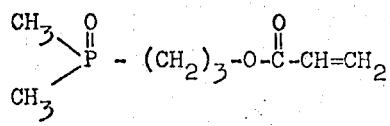

were polymerized in 500 milliliters of a mixture consisting of equal parts of methanol and water at 30°C by adding 2 g of ammonium monopersulfate and 0.4 g of sodium bisulfite. In a 1 percent solution in dimethyl formamide at 25°C, the polymer had a relative viscosity of 3.9. Sheets manufactured on the basis of these polymers, which were prepared according to Example 4, were hard to inflame.

EXAMPLE 7 (copolymer)

14 drops of concentrated sulfuric acid were added to 780 milliliters of water, and the mixture was de-aerated by the introduction of nitrogen. Subsequently, 60 milliliters of a solution of 0.4768 g of iron ammonium sulfate and 5 milliliters of concentrated sulfuric acid in 1 liter of water, 0.45 g of potassium peroxy-disulfate, dissolved in 50 milliliters of water, and 0.15 g of sodium bisulfite in 50 milliliters of water were added. A mixture of 48 g of acrylonitrile and 12 g of the compound

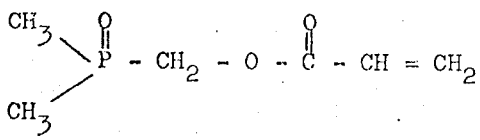

was added to the catalyst solution thus obtained. After 2 hours the polymer was filtered off with suction and was dried at 60°C. 50 g of polymer were obtained which had a relative viscosity of 5.0, measured with a 1 percent solution in dimethyl formamide at 25°C. The polymer contained 2.6 percent of phosphorus. Sheets manufactured on the basis of this material were self-extinguishing.

EXAMPLE 8 (copolymer)

500 milliliters of a mixture consisting of equal parts of water and methanol were de-aerated and covered with nitrogen in an autoclave provided with stirrer at −20°C. Subsequently, 2 g of ammonium persulfate and 0.4 g of sodium bisulfite were added, and, after their dissolution, a mixture was added consisting of 80 g of acrylonitrile, 10 g of vinyl bromide, and 10 g of the compound

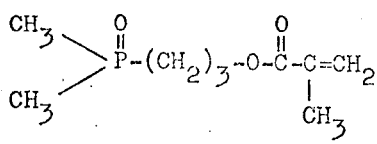

The autoclave was locked and was stirred for 24 hours at +30°C. After filtration by suction and drying, 93 g of polymer were obtained, which had a relative viscosity of 2.9, measured with 1 g of substance in 100 milliliters of dimethyl formamide at 25°C. The polymer contained 6.6 percent of bromine and 1.5 percent of phosphorus. In the form of a solution in dimethyl formamide, it could be cast into sheets, which were self-extinguishing after having been soaked and dried.

EXAMPLE 9 (copolymer)

A monomer mixture consisting of 78 percent by weight of acrylonitrile, 12 percent of vinylidene chloride, and 10 percent of the compound

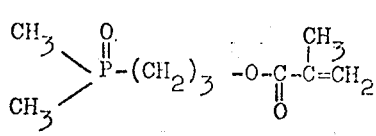

was pumped into a polymerization flask having a capacity of 1 liter in an amount of 100 milliliters per hour. At the same time 100 milliliters per hour of a solution consisting of 80 milliliters of water and 20 milliliters of methanol were added in dosed quantities, in which solution 0.62 g of $CH_3COO\,Na\,3\,H_2O$, about 2 mg of iron ammonium sulfate, and about 5 g of $ZnSO_4\cdot 7\,H_2O$ were dissolved, and which was adjusted to a pH value of about 2.1 by means of sulfuric acid.

Also at the same time the following solutions were added in an amount of 100 milliliters per hour each:
a. a solution of 0.33 g of $K_2S_2O_8$ in 90 milliliters of water and 10 milliliters of methanol,
b. a solution of 1.33 g of $Na_2S_2O_5$ in 90 milliliters of water and 10 milliliters of methanol.

The polymerization was carried out at 30°C with the exclusion of oxygen. After an average polymerization time of 90 minutes, the polymer suspension which had been formed was continuously separated, in which process a reaction rate of about 70 percent can be obtained. The purified and dried polymer showed a relative viscosity of 1.9, measured as a 0.5 percent solution in dimethyl formamide at 20°C. The polymer contained 8.5 percent of chlorine and 1.5 percent of phosphorus.

The polymer obtained was dissolved in dimethyl formamide to give a 23 percent by weight solution which was spun into a bath consisting of 65 percent of dimethyl formamide and 35 percent of water. The filaments were drawn, dried and set in known manner. Textile fabrics made of these filaments were marked by a good capability of being dyed, and they were self-extinguishing.

Filaments on the basis of this copolymer having corresponding properties could also be obtained, if a dry spinning process was applied.

EXAMPLE 10 (homopolymer)

10 grams of dimethyl phosphine-oxidomethyl methacrylate were dissolved in 50 milliliters of water, the solution was deaerated and covered with nitrogen. After addition of 0.2 gram of ammonium-peroxy-disulfate and 0.04 grams of sodium bisulfite the pH of the solution was adjusted to 6 with sodium hydroxide solution and the mixture heated for 10 hours at 50°C. The first thinly liquid solution became highly viscous. In a mixer the solution was stirred into 200 milliliters of acetone, the liquid was decanted and the mixture centrifuged again 3 times, each time with 200 milliliters of acetone. The precipitating polymer, which at the beginning was rubber-like and stringy, acquired a hard and fine-grained consistency during this washing process. It was filtered off with suction and washed with acetone. After drying, 9.2 grams of colorless finegrained polymer were obtained which softened at 164°C.

When rayon staple fiber was impregnated with a 10 percent aqueous solution of the polymer, the inflammability of the fabric was distinctly diminished.

EXAMPLE 11 (copolymer)

In a test tube 3 grams of freshly distilled styrene and 4 grams of dimethyl phosphine oxidomethyl methacrylate were boiled in vacuo for a short period of time at room temperature and covered with nitrogen. After addition of 0.02 gram of azodiiso-butyronitrile the mixture was homogenized while shaking and cautiously heating. The mixture was then heated for 12 hours to 110°C whereby the melt solidified to an artificial glass which was initially clear and became then slightly opaque. By chilling the test tube in icewater the copolymer, which was hard and glass-like, became detached from the tube. The test tube was broken and a hard, dimensionally stable polymer block was obtained. The yield amounted to 6.8 grams. The copolymer did not burn. It softened at 130°–140°C. In contradistinction to polystyrene, it was soluble in methanol. A 20 percent methanolic solution of the copolymer could be cast on glass plates to films, which, after evaporation of the solvent, were hard and clear. In water they swelled considerably.

EXAMPLE 12 (copolymer)

A solution of 15 grams of dimethyl phosphine oxidomethyl methacrylate and 5 grams of vinyl acetate in a mixture of 50 milliliters of water and 50 milliliters of methanol was covered with nitrogen. After addition of 0.4 gram of ammonium peroxidisulfate and 0.08 gram of sodium bisulfite, the reaction mixture was kept for 24 hours at 30°C. During this period of time the initially clear solution became highly viscous. The residual amount of monomeric vinyl acetate at the end of the reaction was less than 0.1 percent, determined by gas chromatography. The copolymer was precipitated in the mixer as described above with a total amount of 1,000 milliliters of acetone. The copolymer which initially separated in rubberlike and stringy form, became hard and granular and could be well filtered off with suction. 12.2 Grams of copolymer were obtained which softened at 162°C and was non combustible.

When a textile fabric was impregnated with a 20 percent aqueous solution of the copolymer, the inflammability of the fabric was distinctly diminished.

EXAMPLE 13 (copolymer)

18 Grams of dimethyl phosphine oxidomethyl methacrylate and 2 grams of vinylidene chloride were introduced at 0°C into a mixture of 80 milliliters of water and 40 milliliters of methanol. The mixture was covered with nitrogen and, after addition of 0.5 gram ammonium peroxi-disulfate and 0.04 gram of sodium bisulfite, the mixture was heated to 30°C. The first heterogeneous reaction mixture became rapidly clear and finally it was highly viscous. After 30 hours it was stirred in a mixer with a total amount of 1,000 milliliters of acetone. The initially rubber-like and stringy copolymer became coarse grained and hard and could be readily filtered off with suction. 18.5 Grams of copolymer softening at 162°C were obtained.

The copolymer contained chlorine. It was non combustible. When a 20 percent methanolic solution of the copolymer was passed through a spinning nozzle into acetone, fibers were obtained.

What is claimed is:

1. A phosphorus-containing solid polymer comprising recurring units of the formula

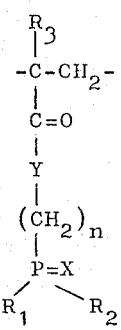

in which $R_1$ and $R_2$ are alkyl groups having from 1 to 3 carbon atoms, $R_3$ is a hydrogen atom or the methyl group, X is oxygen or sulfur, Y is oxygen or a group of the formula —NR—, in which R is a hydrogen atom or an alkyl group having from 1 to 3 carbon atoms and n is 1 to 3.

2. A phosphorus-containing polymer comprising a minor amount of units of the formula

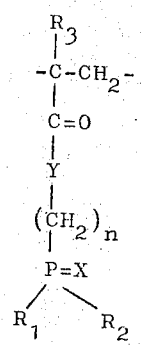

in which $R_1$ and $R_2$ are alkyl groups having from 1 to 3 carbon atoms, $R_3$ is a hydrogen atom or the methyl group, X is oxygen or sulfur, Y is oxygen or a group of the formula —NR—, in which R is a hydrogen atom or an alkyl group having from 1 to 3 carbon atoms and n is 1 to 3; and a major amount of acrylonitrile units.

3. A phosphorus-containing, solid homopolymer consisting essentially of recurring units of the formula

in which $R_1$ and $R_2$ are alkyl groups having from 1 to 3 carbon atoms, $R_3$ is a hydrogen atom or the methyl group, X is oxygen or sulfur, Y is oxygen or a group of the formula —NR—, in which R is a hydrogen atom or an alkyl group having from 1 to 3 carbon atoms and n is 1 to 3.

4. A phosphorus-containing copolymer consisting essentially of recurring structural units of the formula

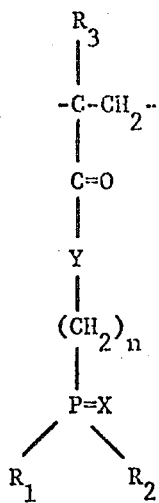

in which $R_1$ and $R_2$ are alkyl groups having from 1 to 3 carbon atoms, $R_3$ is a hydrogen atom or the methyl group, X is oxygen or sulfur, Y is oxygen or a group of the formula —NR—, in which R is hydrogen atom or an alkyl group having from 1 to 3 carbon atoms and $n$ is 1 to 3 and structural units derived from one or more phosphorus-free unsaturated monomers having active double bonds.

5. A phosphorus-containing polymer according to claim 4 comprising at least 0.1 percent by weight of said phosphorus-containing structural units.

6. A phosphorus-containing polymer according to claim 4 comprising from about 5 percent to 45 percent by weight of phosphorus-containing structural units.

7. Filaments, fibers or sheets made of the phosphorus-containing polymer of claim 1.

8. Filaments, fibers or sheets made of the phosphorus-containing polymer of claim 2.

9. Filaments, fibers or sheets made of the phosphorus-containing polymer of claim 4.

* * * * *